US012799292B2

(12) United States Patent
Kontomaris

(10) Patent No.: US 12,799,292 B2
(45) **Date of Patent: *Nov. 17, 2026**

(54) BLOWING AGENT BLENDS FOR THERMOPLASTIC POLYMERS

(71) Applicant: THE CHEMOURS COMPANY FC, LLC, Wilmington, DE (US)

(72) Inventor: Konstantinos Kontomaris, Wilmington, DE (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 1080 days.

This patent is subject to a terminal disclaimer.

(21) Appl. No.: 17/617,155

(22) PCT Filed: Jun. 23, 2020

(86) PCT No.: PCT/US2020/039053

§ 371 (c)(1),
(2) Date: Dec. 7, 2021

(87) PCT Pub. No.: WO2020/263775

PCT Pub. Date: Dec. 30, 2020

(65) Prior Publication Data

US 2022/0235193 A1 Jul. 28, 2022

Related U.S. Application Data

(60) Provisional application No. 62/865,743, filed on Jun. 24, 2019.

(51) Int. Cl.
*C08J 9/14* (2006.01)
*C08J 9/228* (2006.01)

(52) U.S. Cl.
CPC ............... *C08J 9/149* (2013.01); *C08J 9/142* (2013.01); *C08J 9/146* (2013.01); *C08J 9/228* (2013.01); *C08J 2203/12* (2013.01); *C08J 2203/142* (2013.01); *C08J 2203/182* (2013.01); *C08J 2203/202* (2013.01); *C08J 2205/052* (2013.01); *C08J 2325/06* (2013.01); *C08J 2325/12* (2013.01)

(58) Field of Classification Search
CPC ........................................................ C08J 9/149
See application file for complete search history.

(56) References Cited

U.S. PATENT DOCUMENTS

| | | | | | |
|---|---|---|---|---|---|
| 5,221,492 | A * | 6/1993 | Bartlett | C09K 5/045 252/364 |
| 5,863,996 | A * | 1/1999 | Graham | C08F 2/06 526/216 |
| 8,658,708 | B2 | 2/2014 | Loh | |
| 2007/0208094 | A1* | 9/2007 | Handa | C08J 9/142 521/79 |
| 2010/0078585 | A1* | 4/2010 | Robin | A62D 1/0057 252/571 |
| 2010/0087555 | A1* | 4/2010 | Vo | C08J 9/16 521/79 |
| 2011/0144216 | A1* | 6/2011 | Hulse | A01N 29/02 426/534 |
| 2011/0240903 | A1 | 10/2011 | Robin | |
| 2016/0347922 | A1* | 12/2016 | Han | C08J 9/0066 |
| 2018/0327565 | A1* | 11/2018 | Kontomaris | C08L 25/12 |
| 2019/0211172 | A1 | 7/2019 | Wysong | |
| 2019/0218358 | A1 | 7/2019 | Creazzo | |
| 2020/0325297 | A1* | 10/2020 | Kontomaris | C08J 9/146 |
| 2024/0158597 | A1* | 5/2024 | Kontomaris | C08J 9/142 |

FOREIGN PATENT DOCUMENTS

| | | | |
|---|---|---|---|
| CN | 102167842 | A | 8/2011 |
| WO | 2008134061 | A2 | 11/2008 |
| WO | 2017/192550 | A1 | 9/2017 |
| WO | 2019/075040 | A1 | 4/2019 |

OTHER PUBLICATIONS

WO2019/75040 (Year: 2019).*

* cited by examiner

*Primary Examiner* — Irina Krylova

(57) ABSTRACT

This invention relates to the use blends comprising HFO-1336mzz-Z, methyl formate, and optionally, HFC-152a as blowing agents for thermoplastic polymers (e.g., polystyrene).

21 Claims, 2 Drawing Sheets

BLOWING AGENT BLENDS FOR THERMOPLASTIC POLYMERS

CROSS REFERENCE TO RELATED APPLICATIONS

This application is a national filing under 35 U.S. C. 371 of International Application No. PCT/US2020/039053 filed Jun. 23, 2020, and claims priority of U.S. Provisional Application No. 62/865,743 filed Jun. 24, 2019, the disclosures of which are incorporated herein by reference in its entirety.

TECHNICAL FIELD

This invention relates to the use of blends comprising HFO-1336mzz-Z, methyl formate, and optionally, HFC-152a as blowing agents for thermoplastic polymers (e.g., polystyrene).

BACKGROUND

The production of various types of foams historically employed chlorofluorocarbons (i.e., CFCs) as the blowing agent. In general, the CFCs yield foams exhibiting good thermal insulation, low flammability, and excellent dimensional stability. However, despite these advantages the CFCs have fallen into disfavor due to their implication in the destruction of stratospheric ozone, as well as their implication in contributing to global warming. Thus, there is a need for blowing agents to have both low ODP (ozone depletion potential) and GWP (global warming potential).

SUMMARY

The present application provides, inter alia, processes for preparing a thermoplastic polymer foam, the process comprising:

(a) providing a foamable composition comprising a thermoplastic polymer and a blowing agent, wherein the blowing agent comprises from about 30% to about 85% by weight Z-1,1,1,4,4,4-hexafluoro-2-butene and from about 10% to about 40% by weight methyl formate; and (b) expanding the foamable composition to produce the thermoplastic polymer foam.

The present application further provides a thermoplastic polymer foam, comprising:

(a) a thermoplastic polymer selected from the group consisting of polystyrene homopolymer, a polystyrene copolymer, and styrene-acrylonitrile copolymer, or a blend thereof; and (b) a blowing agent comprising from 30% to 85% by weight Z-1,1,1,4,4,4-hexafluoro-2-butene and from 10% to 40% by weight methyl formate.

In some embodiments, the thermoplastic polymer foams provided herein are prepared according to one or more of the processes described herein.

Unless otherwise defined, all technical and scientific terms used herein have the same meaning as commonly understood by one of ordinary skill in the art to which this invention belongs. Methods and materials are described herein for use in the present invention; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control.

DETAILED DESCRIPTION

Figure 1:
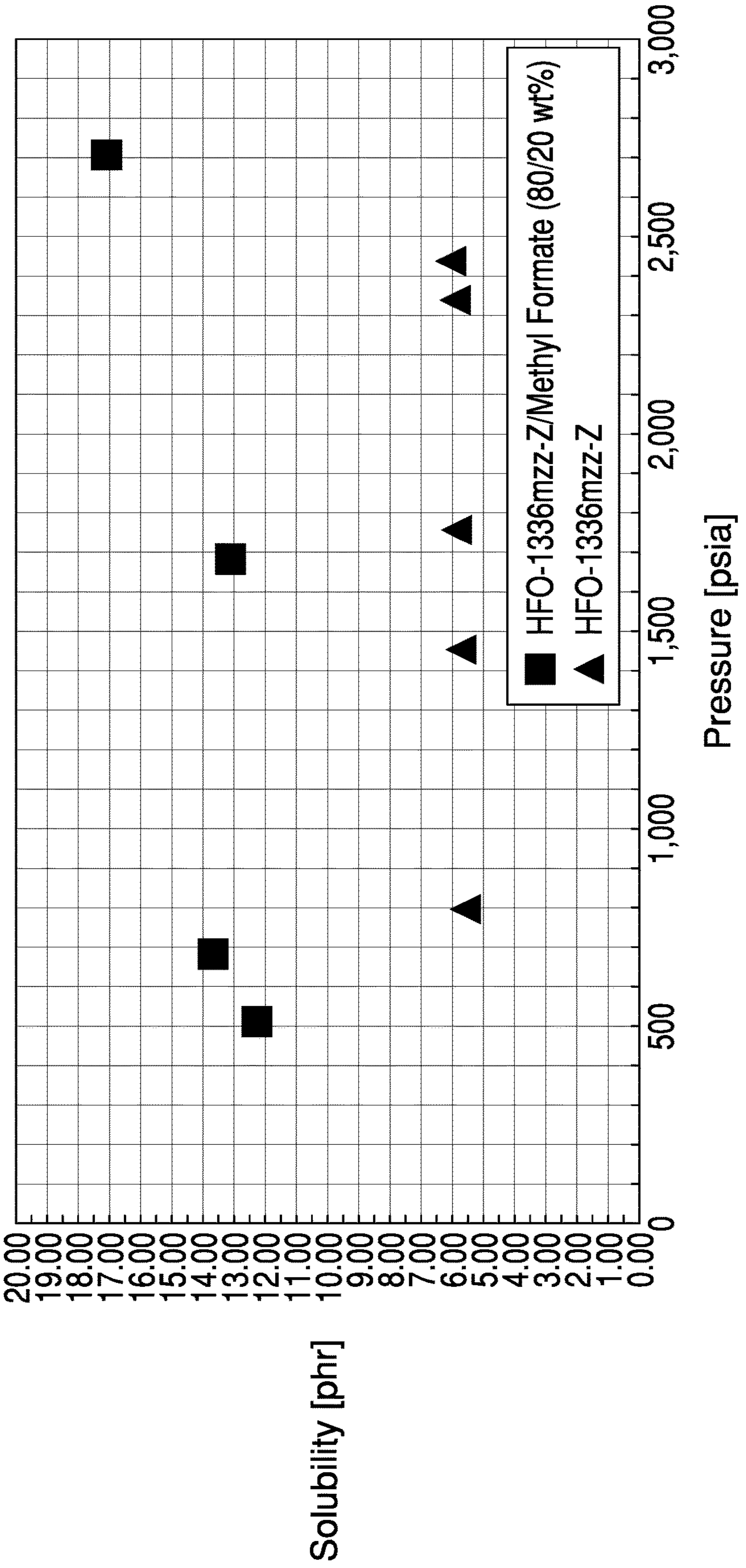
FIG. 1 compares the solubility of a HFO-1336mzz-Z/methyl formate blend containing 20 wt % methyl formate in polystyrene with melt flow index (MFI) 5.00 gr/10 min at 176° C., to the solubility of neat HFO-1336mzz-Z in polystyrene.

Incumbent agents with high global warming potentials (GWPs) for the expansion of thermoplastic foam, e.g. extruded polystyrene foam (XPS), are under regulatory pressure. Z-1,1,1,4,4,4-hexafluoro-2-butene (i.e., HFO-1336mzz-Z) could, in principle, be used as a low-GWP agent for the expansion of polystyrene (or other thermoplastic polymer) into foam with high thermal insulation capability. However, HFO-1336mzz-Z has low solubility in softened polystyrene under the operating conditions of the incumbent extrusion process. As a result, they would lead to suboptimal foam properties (e.g., higher than desirable foam density).

A blowing agent for the expansion of thermoplastic foam (e.g., polystyrene foam) must be sufficiently soluble in the molten thermoplastic polymer (e.g., polystyrene resin) under foam formation conditions so that an adequate volume of the blowing agent is available during the foam expansion and cooling phase to form cells and reduce the effective foam density to the target value. Expansion agent present in excess of its solubility could lead to foam defects.

As described herein, it has been found that, unexpectedly, blends of HFO-1336mzz-Z with methyl formate exhibit solubility in softened polystyrene that significantly exceeds the solubility of neat HFO-1336mzz-Z at the same conditions. For example, the solubility of neat HFO-1336mzz-Z in softened polystyrene homopolymer with a Melt Flow Index (MFI) of 5.0 gr/10 min at 179° C. and 1,682 psia is measured as 5.82 gr per 100 gr of polystyrene (i.e., 5.82 parts of solute per hundred parts of resin by mass or 5.82 phr). In contrast, the solubility of an HFO-1336mzz-Z/methyl formate blend containing 20 wt % methyl formate has a solubility in the same polystyrene under the same temperature and pressure of 13.14 gr per 100 gr of polystyrene or 125.7% higher than the solubility of neat HFO-1336mzz-Z.

It has also been found that, unexpectedly, a ternary blend of HFO-1336mzz-Z/HFC-152a/methyl formate (40 wt %/40 wt %/20 wt %, respectively) exhibits solubility in softened polystyrene that significantly exceeds the solubility, at the same conditions, of a binary blend of HFO-1336mzz-Z/HFC-152a (50 wt %/50 wt %). For example, the solubility of the HFO-1336mzz-Z/HFC-152a blend containing 50 wt % HFC-152a in softened polystyrene homopolymer with a Melt Flow Index (MFI) of 5.0 gr/10 min at 179° C. and 1,336 psia is measured as 9.58 gr per 100 gr of polystyrene (i.e., 9.58 phr). In contrast, the solubility of the ternary HFO-1336mzz-Z/HFC-152a/methyl formate (40 wt %/40 wt %/20 wt %, respectively) blend has a solubility in the same polystyrene under the same temperature and the same pressure (1,336 psia) of approximately 12.80 gr per 100 gr of polystyrene (i.e., 33.61% higher than the solubility of the binary HFO-1336mzz-Z/HFC-152a (50/50 wt %) blend). It has also been found that the solubility of a ternary HFO-1336mzz-Z/HFC-152a/methyl formate (33.33/33.33/33.33 wt %) blend has a solubility in the same polystyrene under the same temperature and the same pressure (1,336 psia) of approximately 16.25 gr per 100 gr of polystyrene (i.e., 69.62% higher than the solubility of the binary HFO-1336mzz-Z/HFC-152a (50/50 wt %) blend).

Accordingly, the blends provided herein and optionally further comprising at least one additional compound provided herein (e.g., an additional compound selected from the group consisting of HFOs, HCFOs, HFCs, HFEs, HCFCs, CFCs, $CO_2$, $N_2$, olefins, hydrochloroolefins, chlorinated hydrocarbons, organic acids, alcohols, hydrocarbons, ethers, aldehydes, ketones, water, ethyl formate, formic acid, and trans-1,2-dichloroethylene (DCE)) could be useful as blowing agents with low or moderate GWP for the expansion of thermoplastic foam, including extruded polystyrene foam.

Definitions & Abbreviations

As used herein, the terms “comprises,” “comprising,” “includes,” “including,” “has,” “having” or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, “or” refers to an inclusive or and not to an exclusive or. For example, a condition A or B is satisfied by any one of the following: A is true (or present) and B is false (or not present), A is false (or not present) and B is true (or present), and both A and B are true (or present).

Also, use of “a” or “an” are employed to describe elements and components described herein. This is done merely for convenience and to give a general sense of the scope of the invention. This description should be read to include one or at least one and the singular also includes the plural unless it is obvious that it is meant otherwise.

As used herein, the term “about” is meant to account for variations due to experimental error (e.g., plus or minus approximately 10% of the indicated value). All measurements reported herein are understood to be modified by the term “about”, whether or not the term is explicitly used, unless explicitly stated otherwise.

As used herein, the term “consisting of” excludes any element, step, or ingredient not specified. If in the claim, such would close the claim to the inclusion of materials other than those recited except for impurities ordinarily associated therewith. When the phrase “consists of” or “consisting of” appears in a clause of the body of a claim, rather than immediately following the preamble, it limits only the element set forth in that clause; other elements are not excluded from the claim as a whole.

As used herein, the term “consisting essentially of” is used to define a composition, method that includes materials, steps, features, components, or elements, in addition to those literally disclosed provided that these additional included materials, steps, features, components, or elements do not materially affect the basic and novel characteristic(s) of the claimed invention, especially the mode of action to achieve the desired result of any of the processes of the present invention. The term “consists essentially of” or “consisting essentially of” occupies a middle ground between “comprising” and “consisting of”.

When an amount, concentration, or other value or parameter is given as either a range, preferred range or a list of upper preferable values and/or lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

Global warming potential (GWP) is an index for estimating relative global warming contribution due to atmospheric emission of a kilogram of a particular greenhouse gas compared to emission of a kilogram of carbon dioxide. GWP can be calculated for different time horizons showing the effect of atmospheric lifetime for a given gas. The GWP for the 100-year time horizon is commonly the value referenced.

As used herein the term “Ozone depletion potential” (ODP) is defined in “The Scientific Assessment of Ozone Depletion, 2002, A report of the World Meteorological Association's Global Ozone Research and Monitoring Project,” section 1.4.4, pages 1.28 to 1.31 (see first paragraph of this section). ODP represents the extent of ozone depletion in the stratosphere expected from a compound on a mass-for-mass basis relative to fluorotrichloromethane (CFC-11).

The following abbreviations may be used herein:

CFC: chlorofluorocarbon
GWP: global warming potential
HCFC: hydrochlorofluorocarbon
HCFO: hydrochlorofluoroolefin
HFC: hydrofluorocarbon
HFE: hydrofluoroether
HFO: hydrofluoroolefin
HFC-152a: 1,1-difluoroethane
HFO-1336mzz-Z or 1336mzz-Z: Z-1,1,1,4,4,4-hexafluoro-2-butene
MFI: Melt Flow Index
ODP: Ozone depletion potential
PS: polystyrene
wt %: weight percent or percent by weight Processes and Foams of the Invention The present application provides processes for preparing a thermoplastic polymer foam.

In some embodiments, the processes provided herein comprise:

(a) providing a foamable composition comprising a thermoplastic polymer and a blowing agent, wherein the blowing agent comprises from about 95% to about 1% by weight Z-1,1,1,4,4,4-hexafluoro-2-butene and from about 1% to about 95% by weight of methyl formate; and (b) expanding the foamable composition to produce the thermoplastic polymer foam.

In some embodiments, the solubility of the blowing agent in the polymer is greater than the solubility of the Z-1,1,1,4,4,4-hexafluoro-2-butene, alone, in the polymer.

In some embodiments, the blowing agent comprises about 90% to about 5% by weight Z-1,1,1,4,4,4-hexafluoro-2-butene, for example, about 90% to about 10%, about 90% to about 30%, about 90% to about 50%, about 90% to about 70%, about 70% to about 5%, about 70% to about 10%, about 70% to about 30%, about 70% to about 50%, about 50% to about 5%, about 50% to about 10%, about 50% to about 30%, about 30% to about 5%, about 30% to about 10%, or about 10% to about 5% by weight Z-1,1,1,4,4,4-hexafluoro-2-butene. In some embodiments, the blowing agent comprises about 75% to about 85% by weight Z-1,1, 1,4,4,4-hexafluoro-2-butene. In some embodiments, the blowing agent comprises about 80% by weight Z-1,1,1,4,4,4-hexafluoro-2-butene. In some embodiments, the blowing agent comprises about 30% to about 45% by weight Z-1,1,1,4,4,4-hexafluoro-2-butene. In some embodiments, the blowing agent comprises about 35% to about 40% by weight Z-1,1,1,4,4,4-hexafluoro-2-butene. In some embodiments, the blowing agent comprises about 30% to about 40% by weight Z-1,1,1,4,4,4-hexafluoro-2-butene. In some embodiments, the blowing agent comprises about 30% to about 35% by weight Z-1,1,1,4,4,4-hexafluoro-2-butene. In some embodiments, the blowing agent comprises about 10% to about 95% by weight Z-1,1,1,4,4,4-hexafluoro-2-butene. In some embodiments, the blowing agent comprises about 30% to about 85% by weight Z-1,1,1,4,4,4-hexafluoro-2-butene. In some embodiments, the blowing agent comprises about 20% to about 60% by weight Z-1,1,1,4,4,4-hexafluoro-2-butene. In some embodiments, the blowing agent comprises about 25% to about 55% by weight Z-1,1,1,4,4,4-hexafluoro-2-butene. In some embodiments, the blowing agent comprises about 80% by weight Z-1,1,1,4,4,4-hexafluoro-2-butene. In some embodiments, the blowing agent comprises about 40% by weight Z-1,1,1,4,4,4-hexafluoro-2-butene. In some embodiments, the blowing agent comprises about 33% by weight Z-1,1,1,4,4,4-hexafluoro-2-butene.

In some embodiments, the blowing agent comprises about 1% to about 90% by weight methyl formate, for example, about 1% to about 70%, about 1% to about 50%, about 1% to about 30%, about 1% to about 10%, about 10% to about 90%, about 10% to about 70%, about 10% to about 50%, about 10% to about 30%, about 30% to about 90%, about 30% to about 70%, about 30% to about 50%, about 50% to about 90%, about 50% to about 70%, or about 70% to about 90% by weight methyl formate. In some embodiments, the blowing agent comprises about 5% to about 45% by weight methyl formate. In some embodiments, the blowing agent comprises about 5% to about 40% by weight methyl formate. In some embodiments, the blowing agent comprises about 10% to about 40% by weight methyl formate. In some embodiments, the blowing agent comprises about 10% to about 25% by weight methyl formate. In some embodiments, the blowing agent comprises about 5% to about 25% by weight methyl formate. In some embodiments, the blowing agent comprises about 15% to about 25% by weight methyl formate. In some embodiments, the blowing agent comprises about 20% by weight methyl formate. In some embodiments, the blowing agent comprises about 15% to about 35% by weight methyl formate. In some embodiments, the blowing agent comprises about 20% to about 35% by weight methyl formate. In some embodiments, the blowing agent comprises about 15% to about 25% by weight methyl formate. In some embodiments, the blowing agent comprises about 18% to about 22% by weight methyl formate. In some embodiments, the blowing agent comprises about 30% to about 35% by weight methyl formate. In some embodiments, the blowing agent comprises about 20% by weight methyl formate. In some embodiments, the blowing agent comprises about 33% by weight methyl formate.

In some embodiments, the blowing agent comprises up to about 80% by weight Z-1,1,1,4,4,4-hexafluoro-2-butene, for example, up to about 70%, 60%, 50%, 40%, 30%, 20%, or 10% by weight Z-1,1,1,4,4,4-hexafluoro-2-butene.

In some embodiments, the blowing agent comprises up to about 35% by weight methyl formate, for example, up to about 33%, 25%, 20%, 15%, 10%, 5%, or 1% by weight methyl formate.

In some embodiments, the blowing agent comprises up to about 80% by weight Z-1,1,1,4,4,4-hexafluoro-2-butene and up to about 33% by weight methyl formate.

In some embodiments, the blowing agent comprises up to about 80% by weight Z-1,1,1,4,4,4-hexafluoro-2-butene and up to about 20% by weight methyl formate.

In some embodiments, the blowing agent consists essentially of Z-1,1,1,4,4,4-hexafluoro-2-butene and methyl formate. In some embodiments, the blowing agent consists of Z-1,1,1,4,4,4-hexafluoro-2-butene and methyl formate.

In some embodiments, the blowing agent provided herein further comprises HFC-152a.

In some embodiments, the solubility of the blowing agent comprising HFC-152a in the polymer is greater than the solubility of the Z-1,1,1,4,4,4-hexafluoro-2-butene, alone, in the polymer. In some embodiments, the solubility of the blowing agent comprising HFC-152a in the polymer is greater than the solubility of a mixture of Z-1,1,1,4,4,4-hexafluoro-2-butene and HFC-152a (i.e., the absence of methyl formate), in the polymer.

In some embodiments, the blowing agent comprising HFC-152a comprises about 5% to about 60% by weight Z-1,1,1,4,4,4-hexafluoro-2-butene, for example, about 5% to about 40%, about 5% to about 20%, about 5% to about 10%, about 10% to about 60%, about 10% to about 40%, about 10% to about 20%, about 20% to about 60%, about 20% to about 40%, or about 40% to about 60% by weight Z-1,1,1,4,4,4-hexafluoro-2-butene. In some embodiments, the blowing agent comprises about 20% to 80% by weight HFC-152a. In some embodiments, the blowing agent comprises about 30% to 70% by weight HFC-152a. In some embodiments, the blowing agent comprises about 30% to about 45% by weight HFC-152a. In some embodiments, the blowing agent comprises about 30% to 40% by weight HFC-152a. In some embodiments, the blowing agent comprises about 40% by weight HFC-152a. In some embodiments, the blowing agent comprises about 30% to 35% by weight HFC-152a. In some embodiments, the blowing agent comprises about 33% by weight HFC-152a.

In some embodiments, the blowing agent comprising HFC-152a comprises about 1% to about 25% by weight methyl formate, for example, about 1% to about 20%, about 1% to about 15%, about 1% to about 10%, about 1% to about 5%, about 5% to about 25%, about 5% to about 20%, about 5% to about 15%, about 5% to about 10%, about 10% to about 25%, about 10% to about 20%, about 10% to about 15%, about 15% to about 25%, about 15% to about 20%, or about 20% to about 25% by weight methyl formate. In some embodiments, the blowing agent comprising HFC-152a comprises about 1% to about 20% by weight methyl formate.

In some embodiments, the blowing agent comprising HFC-152a comprises about 5% to about 95% by weight HFC-152a, for example, about 5% to about 80%, about 5% to about 50%, about 5% to about 25%, about 5% to about 10%, about 10% to about 95%, about 10% to about 80%, about 10% to about 50%, about 10% to about 25%, about 25% to about 95%, about 25% to about 80%, about 25% to about 50%, about 50% to about 95%, about 50% to about 80%, or about 80% to about 95% by weight HFC-152a. In some embodiments, the blowing agent comprising HFC-152a comprises about 20% to about 80% by weight HFC- 152a. In some embodiments, the blowing agent comprising HFC-152a comprises about 50% to about 70% by weight HFC-152a.

In some embodiments, the blowing agent consists essentially of Z-1,1,1,4,4,4-hexafluoro-2-butene, methyl formate, and HFC-152a. In some embodiments, the blowing agent consists of Z-1,1,1,4,4,4-hexafluoro-2-butene, methyl formate, and HFC-152a.

In some embodiments, the blowing agent comprises:
- about 75% to about 85% by weight Z-1,1,1,4,4,4-hexafluoro-2-butene; and
- about 15% to about 25% by weight methyl formate.

In some embodiments, the blowing agent comprises:
- about 10% to about 95% by weight Z-1,1,1,4,4,4-hexafluoro-2-butene; and
- about 5% to about 40% by weight methyl formate.

In some embodiments, the blowing agent comprises:
- about 30% to about 85% by weight Z-1,1,1,4,4,4-hexafluoro-2-butene; and
- about 10% to about 40% by weight methyl formate.

In some embodiments, the blowing agent comprises:
- about 20% to about 60% by weight Z-1,1,1,4,4,4-hexafluoro-2-butene; and
- about 5% to about 25% by weight methyl formate.

In some embodiments, the blowing agent comprises:
- about 20% to about 55% by weight Z-1,1,1,4,4,4-hexafluoro-2-butene; and
- about 5% to about 45% by weight methyl formate.

In some embodiments, the blowing agent comprises:
- about 20% to about 55% by weight Z-1,1,1,4,4,4-hexafluoro-2-butene; and
- about 10% to about 25% by weight methyl formate.

In some embodiments, the blowing agent comprises:
- about 20% to about 55% by weight Z-1,1,1,4,4,4-hexafluoro-2-butene;
- about 5% to about 45% by weight methyl formate; and
- about 30% to about 70% by weight HFC-152a.

In some embodiments, the blowing agent comprises:
- about 20% to about 55% by weight Z-1,1,1,4,4,4-hexafluoro-2-butene;
- about 10% to about 25% by weight methyl formate; and
- about 30% to about 70% by weight HFC-152a.

In some embodiments, the blowing agent comprises about 80 wt % Z-1,1,1,4,4,4-hexafluoro-2-butene and about 20 wt % methyl formate.

In some embodiments, the blowing agent comprises:
- about 30% to about 45% by weight Z-1,1,1,4,4,4-hexafluoro-2-butene;
- about 15% to about 35% by weight methyl formate; and
- about 30% to about 45% by weight HFC-152a.

In some embodiments, the blowing agent comprises:
- about 30% to about 40% by weight Z-1,1,1,4,4,4-hexafluoro-2-butene;
- about 20% to about 35% by weight methyl formate; and
- about 30% to about 40% by weight HFC-152a.

In some embodiments, the blowing agent comprises:
- about 35% to about 45% by weight Z-1,1,1,4,4,4-hexafluoro-2-butene;
- about 15% to about 25% by weight methyl formate; and
- about 35% to about 45% by weight HFC-152a.

In some embodiments, the blowing agent comprises:
- about 30% to about 35% by weight Z-1,1,1,4,4,4-hexafluoro-2-butene;
- about 30% to about 35% by weight methyl formate; and
- about 30% to about 35% by weight HFC-152a.

In some embodiments, the blowing agent comprises about 40 wt % Z-1,1,1,4,4,4-hexafluoro-2-butene, about 20 wt % methyl formate, and about 40 wt % HFC-152a.

In some embodiments, the blowing agent comprises about 33 wt % Z-1,1,1,4,4,4-hexafluoro-2-butene, about 33 wt % methyl formate, and about 33 wt % HFC-152a.

In some embodiments, the process of the invention further comprises heating the polymer and blowing agent in the presence of one or more additives. Exemplary additives include, but are not limited to, nucleating agents, cell stabilizer agents, surfactants, preservative colorants, antioxidants, reinforcing agents, fillers, antistatic agents, IR attenuating agents, extrusion aids, plasticizers, and viscosity modifiers, or any combination thereof, in an amount to obtain the effect desired.

In some embodiments, the blowing agent provided herein is substantially free of additives. In some embodiments, the blowing agent provided herein comprises one or more additives (e.g., one, two, three, four, or five additives).

In some embodiments, the process of the invention is performed in the presence of a nucleating agent. In some embodiments, the nucleating agent is selected from talc, graphite, and magnesium silicate.

In some embodiments, the foamable composition further comprises a flame retardant. In some embodiments, the flame retardant comprises a polymeric flame retardant or a halogenated flame retardant. In some embodiments, the flame retardant is a brominated flame retardant or a chlorinated flame retardant. In some embodiments, the flame retardant is a brominated styrene-butadiene block copolymer. One example of a brominated styrene-butadiene block copolymer is known commercially as PolyFR.

In some embodiments, the foamable composition further comprises an Infrared Attenuating Agent.

As used herein, the term "molten composition" refers to a foamable composition. The amount of blowing agent in the molten composition will depend on the amount of additives other than blowing agent and the density desired in the foamed product. In some embodiments, the amount of blowing agent in the foamable composition is from about 5 to about 20 wt %. In some embodiments, the amount of blowing agent in the foamable composition is from about 5 to about 15 wt %, based on the weight of the foamable composition. It is understood that the weight percentage of the blowing agent in the foamable composition can be adjusted based on the desired density of the foam, and the ratio of components in the blowing agent.

In some embodiments, the blowing agent is from about 5 parts to about 25 parts per hundred parts of polymer by mass, for example, about 5 to about 20, about 5 to about 15, about 5 to about 10, about 10 to about 25, about 10 to about 20, about 10 to about 15, about 15 to about 25, about 15 to about 20, or about 20 to about 25 parts per hundred parts of polymer by mass. In some embodiments, the blowing agent is from about 7 parts to about 18 parts per hundred parts of polymer by mass.

In some embodiments, the thermoplastic polymer provided herein is an alkenyl aromatic polymer. As used herein, the term "alkenyl aromatic polymer" refers to a polymer formed from alkenyl-aromatic monomer units. In some embodiments, the alkenyl-aromatic monomer unit is a $C_{2-6}$ alkenyl-$C_{6-10}$ aryl monomer unit. In some embodiments, the alkenyl-aromatic monomer unit is a $C_{2-6}$ alkenyl-phenyl monomer unit, wherein the phenyl is optionally substituted. In some embodiments, the alkenyl aromatic polymer is polystyrene.

The polystyrene can be styrene homopolymer or can contain copolymerized monomer other than styrene (i.e., polystyrene copolymer). In some embodiments, the thermoplastic polymer comprises a blend of polystyrene and an additional thermoplastic polymer. In some embodiments, the additional thermoplastic polymer is a copolymer of styrene with a monomer other than styrene (e.g., acrylonitrile).

In some embodiments, the thermoplastic polymer is selected from polystyrene, polyethylene, polyethylene copolymer, polypropylene, polypropylene copolymer, acrylonitrile butadiene styrene, styrene acrylonitrile copolymer, and blends thereof. In some embodiments, the thermoplastic polymer is selected from polystyrene, polyethylene, and polypropylene. In some embodiments, the thermoplastic polymer is a polyethylene-polypropylene copolymer. In some embodiments, the thermoplastic polymer is polystyrene.

Whether the thermoplastic polymer being foamed is polystyrene or blends of polystyrene with other thermoplastic polymer, styrene is preferably the dominant polymerized monomer (unit) in the thermoplastic polymer being foamed. In some embodiments, the polymerized units of styrene constitute at least 70 mol %, at least 80 mol %, at least 90 mol %, or at least 100 mol % of the polymerized monomer units of the thermoplastic polymer.

When the thermoplastic polymer contains styrene copolymer, the amount of the additional monomer copolymerized with the styrene is such that the styrene content of the copolymer is at least 60 mol % of the copolymer, at least 70 mol %, at least 80 mol %, or at least 90 mol % of the copolymer, based on the total number of moles (i.e., 100%) of the copolymer. It is understood that these ratios apply whether the styrene copolymer is the only styrene-containing polymer in the thermoplastic polymer or is a blend with other thermoplastic polymer, such as styrene homopolymer or other styrene copolymer.

In some embodiments, the thermoplastic polymer comprises styrene homopolymer (i.e., polystyrene homopolymer). When the thermoplastic polymer is a blend of polystyrene and other thermoplastic polymer as described above, the polystyrene component of this blend is preferably styrene homopolymer comprising at least 80 wt % of the combined weight of polystyrene and other thermoplastic polymer.

The molecular weight of the thermoplastic polymer comprising polystyrene being foamed is sufficiently high to provide the strength necessary for the requirements of the foam application. The strength requirement determines the minimum density of the foamed product. The high molecular weight of the thermoplastic polymer comprising polystyrene also contributes to the strength of the foamed product. An indicator of molecular weight is the rate at which the molten polymer flows through a defined orifice under a defined load. The lower the flow, the higher the molecular weight. Measurement of the melt flow rate is determined in accordance with ASTM D 1238 at 200° C. and using a 5 kg weight on the molten polymer. The weight of molten polymer flowing through the orifice in a defined amount of time, enables the melt flow rate to be reported in g/10 min. Preferably the melt flow rate of the thermoplastic polymer comprising polystyrene is no greater than 20 g/10 min, more preferably no greater than 15 g/10 min, and most preferably, no greater than 10 g/10 min. Surprisingly the higher the molecular weight (lower the melt flow rate), the better the foaming result, especially with respect to the attainability of low density foamed products, while still achieving smooth skin on the foamed product. Preferably the minimum melt flow rate for all the melt flow rates disclosed herein is at least 1 g/10 min, whereby the melt flow rate ranges disclosed herein include, but are not limited to, 1 to 25, 1 to 20, 1 to 15, and 1 to 10 g/10 min. In some embodiments, the melt flow rate is about 25 g/10 min or less, as determined in accordance with the procedure of ASTM D 1238 at 200° C. using a 5 kg weight on the molten polymer.

The references to thermoplastic polymer comprising polystyrene also apply to polystyrene by itself. Thus, for example, the disclosure of thermoplastic polymer comprising polystyrene in the preceding paragraph can be replaced by the disclosure polystyrene.

In some embodiments, the process of the invention further comprises extruding the thermoplastic polymer to form a thermoplastic polymer foam comprising Z-1,1,1,4,4,4-hexafluoro-2-butene, methyl formate, and optionally HFC-152a.

In some embodiments, the extruding is performed at a die temperature of from about 100° C. to about 150° C., for example, about 100° C. to about 140° C., about 100° C. to about 130° C., about 100° C. to about 120° C., about 100° C. to about 110° C., about 110° C. to about 150° C., about 110° C. to about 140° C., about 110° C. to about 130° C., about 110° C. to about 120° C., about 120° C. to about 150° C., about 120° C. to about 140° C., about 120° C. to about 130° C., about 130° C. to about 150° C., about 130° C. to about 140° C., or about 140° C. to about 150° C. In some embodiments, the extruding is performed at a die temperature of from about 110° C. to about 140° C. In some embodiments, the extruding is performed at a die temperature of from about 120° C. to about 130° C.

In some embodiments, the process of the invention is performed in an extruder to 1) form the foamable composition into a desired form; and 2) to extrude the foamable composition to form a thermoplastic polymer foam comprising Z-1,1,1,4,4,4-hexafluoro-2-butene, methyl formate, and, optionally, HFC-152a.

When the process of the invention is performed in an extruder, the thermoplastic polymer forms the feed to the extruder. The blowing agent and co-blowing agent are preferably fed into the extruder at a location intermediate to the feed and extrusion ends of the extruder, typically into the foamable composition that is created as the extrusion screw advances the feeds along the length of the extruder. Additional additives may be added where convenient and as may be dictated by the state of the additive. For example, solid additives can be conveniently be added to the feed end of the extruder, possibly as a mixture with the polymer feed in particulate form to the extruder. The resulting foamable composition within the extruder is extruded through a die, thereby allowing the foamable composition to expand into the foamed product of a desired shape (e.g., a sheet, a plank, a rod, or a tube) and subsequently cooled.

In the region within the extruder where the composition is melted to form the molten composition, this melting occurring by the input of heat and the heat developed in the mixing process forming the melt, this is considered the melt mixing region. In one embodiment, the temperature is at least 185° C., more preferably at least 190° C. or at least 200° C. or at least 210° C. In some embodiments, the maximum temperature for all the melt mixing temperatures disclosed herein is 250° C. The melt mixing temperatures disclosed herein are the temperatures of the melt in the mixing zone at the time of mixing. In some embodiments, the pressure under which the melt mixing is carried out is at least 3000 psi (207 Bar), more preferably at least 3500 psi (241 Bar), more preferably at least 4000 psi (276 Bar). In some embodiment, the maximum value for all the minimum pressures disclosed under which the melt mixing is carried out is no greater than 5000 psi (345 Bar). The pressures disclosed herein are gauge pressures.

In the region within the extruder where the molten composition is extruded, the molten composition is cooled so that the temperature at which the extrusion is carried out is preferably at least 105° C., more preferably 110° C., more preferably at least 125° C. In some embodiments, the maximum value for all the minimum extrusion temperatures disclosed herein is preferably no greater than 140° C. The extrusion temperatures disclosed herein are the temperature of the melt at the time of extrusion.

In some embodiments, the extrusion is preferably carried out with a pressure of at least 1500 psi (103 Bar), more preferably at least 1600 psi (110 Bar). The maximum value for the minimum extrusion pressures disclosed herein is preferably no greater than 2000 psi (138 Bar). The extrusion pressure is the pressure inside the extrusion die.

In some embodiments, the process is performed at a pressure just before foaming of from about 100 psi to about 5000 psi, for example, about 100 psi to about 4000 psi, about 100 psi to about 3000 psi, about 100 psi to about 2000 psi, about 100 psi to about 1000 psi, about 1000 psi to about 5000 psi, about 1000 psi to about 4000 psi, about 1000 psi to about 3000 psi, about 1000 psi to about 2000 psi, about 2000 psi to about 5000 psi, about 2000 psi to about 4000 psi, about 2000 psi to about 3000 psi, about 3000 psi to about 5000 psi, about 3000 psi to about 4000 psi, or about 4000 psi to about 5000 psi. In some embodiments, the process is performed at a pressure just before foaming of from about 500 psi to about 4000 psi. In some embodiments, the process is performed at a pressure just before foaming of from about 800 psi to about 3000 psi. In some embodiments, the process is performed at a pressure just before foaming of from about 1000 psi to about 2500 psi.

The disclosures of multiple ranges for melt flow rate, temperature and pressure above can be used in any combination in the practice of the present invention to obtain the particular foamed structure desired. For example, melt mixing pressures of 3000 to 5000 psi (207 to 345 Bar) are preferred for achieving low foam densities of the foamed product, and this temperature range can be used with any of the melt mixing and extrusion temperature ranges to form any of the smooth-skin, closed cell foam product densities disclosed herein. The same is true for the melt extrusion pressure range of 1500 to 2000 psi (103 to 138 Bar) together with the 3000 to 5000 psi (207 to 345 bar) pressure range for melt mixing. Most preferably, the two preferred pressure ranges, for melt mixing (207 to 345 Bar) and extrusion (103 to 138 bar) are used together. The melt flow rates for the polymer being foamed of no greater than 25, 20, 15, and 10, and as little as at least 1, all values being in g/10 min, can be used with any of these combinations of pressure and temperatures, depending on the foamed product result desired.

When the process of the invention is performed in an extruder, the thermoplastic polymer (i.e., the foamable composition) is cooled such that the temperature at which the extrusion is performed is preferably at least 125° C. and more preferably at least 130° C. In some embodiments, the temperature at which the extrusion is performed is a temperature less than the first temperature of the process of the invention. In some embodiments, the maximum value for all the minimum extrusion temperatures disclosed herein is about 150° C. or less. In some embodiments, the extruding is performed at a temperature of from about 100° C. to about 150° C. In some embodiments, the extruding is performed at a temperature of from about 110° C. to about 140° C.

In some embodiments, the extrusion temperature disclosed herein is the temperature of the polymer melt at the time of extrusion.

When the process of the invention is performed in an extruder, the extrusion is preferably performed with a pressure of at least 1500 psi (103 Bar) and more preferably at least 1600 psi (110 Bar). The maximum value for the minimum extrusion pressures disclosed herein is preferably no greater than 2000 psi (138 Bar). In some embodiments, the extruding is performed at a pressure of from about 1500 psi to about 2000 psi. In some embodiments, the extrusion pressure disclosed herein is the pressure inside the extrusion die.

In some embodiments, the extruding is performed at a pressure of from about 100 psi to about 5000 psi, for example, about 100 psi to about 4000 psi, about 100 psi to about 2000 psi, about 100 psi to about 1000 psi, about 1000 psi to about 5000 psi, about 1000 psi to about 4000 psi, about 1000 psi to about 2000 psi, about 2000 psi to about 5000 psi, about 2000 psi to about 4000 psi, or about 4000 psi to about 5000 psi.

In some embodiments, the extruding is performed at a pressure of from about 500 psi to about 4000 psi.

In some embodiments, the extruding is performed at a pressure of from about 750 psia to about 3000 psia.

In some embodiments, the extruding is performed at a pressure of from about 900 psia to about 2750 psia.

In some embodiments, the present application provides a foam product (e.g., a thermoplastic polymer foam) prepared according to one or more of the processes described herein.

In some embodiments, the foam comprises:

(a) a thermoplastic polymer selected from the group consisting of polystyrene homopolymer, a polystyrene copolymer, and styrene-acrylonitrile copolymer, or a blend thereof; and
(b) a blowing agent provided herein (i.e., a blowing agent comprising Z-1,1,1,4,4,4-hexafluoro-2-butene, methyl formate, and, optionally, HFC-152a).

In some embodiments, the foam comprises:

(a) a thermoplastic polymer selected from the group consisting of polystyrene homopolymer, a polystyrene copolymer, and styrene-acrylonitrile copolymer, or a blend thereof; and
(b) a blowing agent comprising Z-1,1,1,4,4,4-hexafluoro-2-butene and methyl formate as provided herein.

In some embodiments, the foam comprises:

(a) a thermoplastic polymer selected from the group consisting of polystyrene homopolymer, a polystyrene copolymer, and styrene-acrylonitrile copolymer, or a blend thereof; and
(b) a blowing agent comprising Z-1,1,1,4,4,4-hexafluoro-2-butene, methyl formate, and HFC-152a as provided herein.

In some embodiments, the foam provided herein further comprises one or more additives described herein.

It is understood that the blowing agent blends, additives, melt flow rates, temperatures, pressures, and other process parameters described herein can be used in any combination in the practice of the present invention to obtain the particular foamed structure desired.

In some embodiments, the thermoplastic polymer foams provided herein comprise one or more of the following properties:

Closed cells—at least 70%, at least 80%, at least 90%, or at least 95%. Closed cell content can be measured according to ASTM method D6226-05.

Average Cell Size: From about 0.005 mm to about 5 mm (i.e., 5 μm to about 5000 μm), for example, about 0.01 mm to about 5 mm, about 0.05 mm to about 5 mm, about 0.05 mm to about 0.5 mm. In some embodiments, the average cell size is from about 0.01 mm to about 1 mm. In some embodiments, the average cell size is from about 0.02 mm to about 0.5 mm. In some embodiments, the average cell size is from about 0.1 mm to about 0.3 mm.

Density no greater than about 40 kg/$m^3$, no greater than about 35 kg/$m^3$, or no greater than about 23 kg/$m^3$. Density can be measured according to ISO method 845 85.

Smooth skin.

Substantially free of blowholes.

EXAMPLES

The invention will be described in greater detail by way of specific examples. The following examples are offered for illustrative purposes, and are not intended to limit the invention in any manner.

Example 1. Solubility of an HFO-1336mzz-Z/Methyl Formate Blend in Softened Polystyrene Homo-Polymer This example demonstrates the enhanced solubility of Z-1,1,1,4,4,4-hexafluoro-2-butene (i.e., HFO-1336mzz-Z)/methyl formate blends in softened polystyrene compared to the solubility of neat HFO-1336mzz-Z in softened polystyrene.

The solubilities of HFO-1336mzz-Z and an HFO-1336mzz-Z/methyl formate blend containing 20 wt % methyl formate in softened polystyrene were determined by the following procedure: 78 gr of Polystyrene was loaded into a stainless steel Parr© reactor. The reactor was weighed, mounted to inlet/outlet piping, immersed in an oil bath and evacuated. An HIP pressure generator (made by High Pressure Equipment Company) was used to load an amount of blowing agent in excess of its expected solubility into the evacuated reactor. The oil bath was heated and maintained at a temperature of 179° C. for 30 minutes before the final pressure was recorded. The Parr© reactor was removed from the oil bath and cooled to room temperature. The reactor (with re-solidified polystyrene inside) was weighed after excess (non-dissolved in the polystyrene) blowing agent was drained or vented. The weight gain was recorded as solubility according to the following equation:

$$\text{solubility(phr)}=(\text{resin weight gain}\div 78)\times 100. \quad \text{Equation 1.}$$

As shown in FIG. 1, it was found that, unexpectedly, the blend of HFO-1336mzz-Z with methyl formate exhibited solubility in softened polystyrene that significantly exceeded the solubility of neat HFO-1336mzz-Z at the same conditions. For example, the solubility of neat HFO-1336mzz-Z in softened polystyrene homopolymer with a Melt Flow Index (MFI) of 5.0 gr/10 min at 179° C. and 1,682 psia is measured as 5.82 gr per 100 gr of polystyrene (i.e., 5.82 phr). In contrast, the solubility of an HFO-1336mzz-Z/methyl formate blend containing 20 wt % methyl formate exhibited a solubility in the same polystyrene under the same temperature and pressure of 13.14 gr per 100 gr of polystyrene, or 125.7% higher than the solubility of neat HFO-1336mzz-Z.

Example 2. Solubility of an HFO-1336mzz-Z/Methyl Formate Blend in Softened Polystyrene Homo-Polymer This example demonstrates the enhanced solubility of Z-1,1,1,4,4,4-hexafluoro-2-butene (i.e., HFO-1336mzz-Z)/HFC-152a/methyl formate blends in softened polystyrene compared to the solubility of a blend of HFO-1336mzz-Z/HFC-152a in softened polystyrene homopolymer. The solubility analysis was conducted according to the general procedures described in Example 1.

Figure 2:
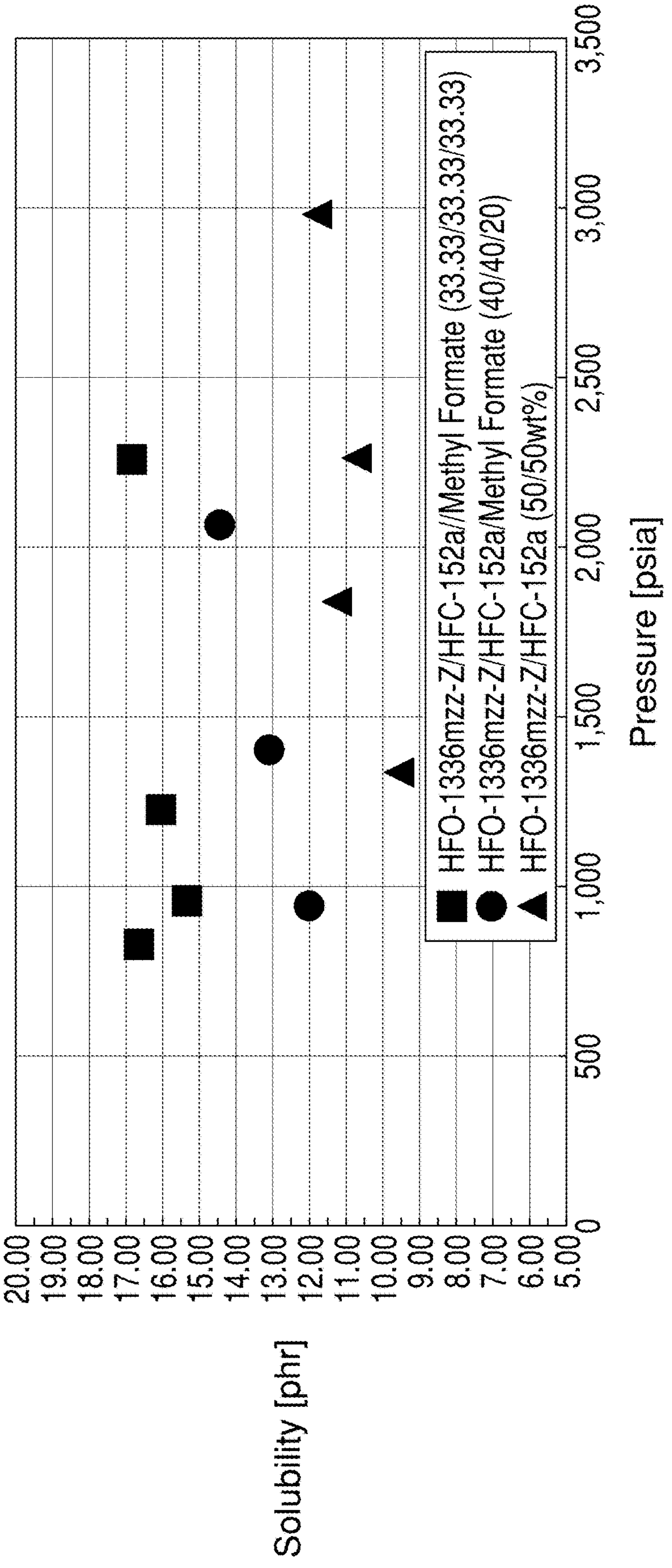
FIG. 2 compares the solubility of HFO-1336mzz-Z/HFC-152a/methyl formate blends in polystyrene homopolymer with MFI 5.00 gr/10 min at 176° C., to the solubility of a HFO-1336mzz-Z/HFC-152a (50 wt %/50 wt %) blend.

As shown in FIG. 2, it was found that, unexpectedly, ternary blends of HFO-1336mzz-Z/HFC-152a/methyl formate (e.g., 40 wt %/40 wt %/20 wt %; and (33.33 wt %/33.33 wt %/33.33 wt %, respectively) exhibit solubility in softened polystyrene that significantly exceeds the solubility, at the same conditions, of a binary blend of HFO-1336mzz-Z/HFC-152a (50 wt %/50 wt %).

For example, the solubility of the 50 wt %/50 wt % HFO-1336mzz-Z/HFC-152a blend in softened polystyrene homopolymer with a Melt Flow Index (MFI) of 5.0 gr/10 min at 179° C. and 1,336 psia is measured as 9.58 gr per 100 gr of polystyrene (i.e., 9.58 phr). In contrast, the solubility of a ternary HFO-1336mzz-Z/HFC-152a/methyl formate (40 wt %/40 wt %/20 wt %, respectively) exhibited a solubility in the same polystyrene under the same temperature and the same pressure of approximately 12.80 gr per 100 gr of polystyrene or 33.61% higher than the solubility of the binary HFO-1336mzz-Z/HFC-152a blend. The solubility of a ternary HFO-1336mzz-Z/HFC-152a/methyl formate (33.33 wt %/33.33 wt %/33.33 wt %) blend exhibited a solubility in the same polystyrene under the same temperature and the same pressure of approximately 16.25 gr per 100 gr of polystyrene or 69.62% higher than the solubility of the binary HFO-1336mzz-Z/HFC-152a blend.

Other Embodiments

1. In some embodiments, the present application provides a process for preparing a thermoplastic polymer foam, the process comprising:

(a) providing a foamable composition comprising a thermoplastic polymer and a blowing agent, wherein the blowing agent comprises from about 95% to about 1% by weight Z-1,1,1,4,4,4-hexafluoro-2-butene and from about 1% to about 95% by weight of methyl formate; and (b) expanding the foamable composition to produce the thermoplastic polymer foam.

2. The process of embodiment 1, wherein the solubility of the blowing agent in the polymer is greater than the solubility of the Z-1,1,1,4,4,4-hexafluoro-2-butene, alone, in the polymer.

3. The process of embodiment 1 or 2, wherein the blowing agent comprises about 75% to about 85% by weight Z-1,1,1,4,4,4-hexafluoro-2-butene.

4. The process of embodiment 1 or 2, wherein the blowing agent comprises about 80% by weight Z-1,1,1,4,4,4-hexafluoro-2-butene.

5. The process of any one of embodiments 1 to 4, wherein the blowing agent comprises about 15% to about 25% by weight methyl formate.

6. The process of any one of embodiments 1 to 4, wherein the blowing agent comprises about 20% by weight methyl formate.

7. The process of any one of embodiments 1 to 6, wherein the blowing agent consists essentially of Z-1,1,1,4,4,4-hexafluoro-2-butene and methyl formate.

8. The process of embodiment 1 or 2, wherein the blowing agent further comprises HFC-152a.

9. The process of embodiment 8, wherein the solubility of the blowing agent in the polymer is greater than the solubility of a mixture of Z-1,1,1,4,4,4-hexafluoro-2-butene and HFC-152a, in the polymer.

10. The process of embodiment 8 or 9, wherein the blowing agent comprises about 30% to about 45% by weight Z-1,1,1,4,4,4-hexafluoro-2-butene.

11. The process of embodiment 8 or 9, wherein the blowing agent comprises about 30% to about 40% by weight Z-1,1,1,4,4,4-hexafluoro-2-butene.

12. The process of any one of embodiments 8 to 11, wherein the blowing agent comprises about 15% to about 35% by weight methyl formate.

13. The process of any one of embodiments 8 to 11, wherein the blowing agent comprises about 20% to about 35% by weight methyl formate.

14. The process of any one of embodiments 8 to 13, wherein the blowing agent comprises about 30% to about 45% by weight HFC-152a.

15. The process of any one of embodiments 8 to 13, wherein the blowing agent comprises about 30% to about 40% by weight HFC-152a.

16. The process of any one of embodiments 8 to 15, wherein the blowing agent consists essentially of Z-1,1,1,4,4,4-hexafluoro-2-butene, methyl formate, and HFC-152a.

17. The process of any one of embodiments 1 to 16, wherein the thermoplastic polymer is an alkenyl aromatic polymer.

18. The process of any one of embodiments 1 to 16, wherein the thermoplastic polymer is selected from the group consisting of polystyrene, polyethylene, polyethylene copolymer, polypropylene, polypropylene copolymer, acrylonitrile butadiene styrene, and styrene acrylonitrile copolymer, and blends thereof.

19. The process of any one of embodiments 1 to 16, wherein the thermoplastic polymer is selected from the group consisting of a polystyrene homopolymer, a polystyrene copolymer, styrene-acrylonitrile copolymer, and blends thereof.

20. The process of any one of embodiments 1 to 19, wherein the process is performed at a pressure just before foaming of from about 100 psi to about 5000 psi.

21. The process of any one of embodiments 1 to 19, wherein the process is performed at a pressure just before foaming of from about 750 psi to about 2500 psi.

22. The process of any one of embodiments 1 to 21, further comprising extruding the thermoplastic polymer to form the thermoplastic polymer foam.

23. The process of embodiment 21, wherein the extruding is performed at a die temperature of from about 100° C. to about 150° C.

24. The process of embodiment 21, wherein the extruding is performed at a die temperature of from about 110° C. to about 140° C.

25. The process of embodiment 21, wherein the extruding is performed at a die temperature of from about 120° C. to about 130° C.

26. The process of any one of embodiments 1 to 25, wherein the polymer foam is a closed cell polymer foam.

27. The process of any one of embodiments 1 to 26, wherein the polymer comprises at least 70% closed cells.

28. The process of any one of embodiments 1 to 27, wherein the polymer foam is a smooth skin polymer foam.

29. The process of any one of embodiments 1 to 28, wherein the polymer foam is substantially free of blowholes.

30. The process of any one of embodiments 1 to 29, wherein the polymer is a polystyrene homopolymer.

31. The process of any one of embodiments 1 to 30, wherein the foamable composition further comprises nucleating agent.

32. The process of embodiment 31, wherein the nucleating agent is selected from the group consisting of talc, graphite, and magnesium silicate.

33. The process of any one of embodiments 1 to 32, wherein the foamable composition further comprises a flame retardant.

34. The process of embodiment 33, wherein the flame retardant comprises a polymeric flame retardant or a halogenated flame retardant.

35. The process of embodiment 33, wherein the flame retardant is a brominated flame retardant or a chlorinated flame retardant.

36. The process of embodiment 33, wherein the flame retardant is a brominated styrene-butadiene block copolymer.

37. The process of any one of embodiments 1 to 36, wherein the foamable composition further comprises an Infrared Attenuating Agent.

38. The process of any one of embodiments 1 to 37, wherein the blowing agent is from about 1 part to about 25 parts per hundred parts of polymer by mass.

39. The process of any one of embodiments 1 to 37, wherein the blowing agent is from about 7 parts to about 18 parts per hundred parts of polymer by mass.

40. In some embodiments, the present application provides a thermoplastic polymer foam, comprising:

(a) a thermoplastic polymer selected from the group consisting of polystyrene homopolymer, a polystyrene copolymer, and styrene-acrylonitrile copolymer, or a blend thereof; and (b) a blowing agent comprising from about 95% to about 1% by weight Z-1,1,1,4,4,4-hexafluoro-2-butene and from about 1% to about 95% by weight of methyl formate.

41. The thermoplastic polymer foam of embodiment 40, wherein the blowing agent comprises about 75% to about 85% by weight Z-1,1,1,4,4,4-hexafluoro-2-butene.

42. The thermoplastic polymer foam of embodiment 40, wherein the blowing agent comprises about 80% by weight Z-1,1,1,4,4,4-hexafluoro-2-butene.

43. The thermoplastic polymer foam of any one of embodiments 40 to 42, wherein the blowing agent comprises about 15% to about 25% by weight methyl formate.

44. The thermoplastic polymer foam of any one of embodiments 40 to 42, wherein the blowing agent comprises about 20% by weight methyl formate.

45. The thermoplastic polymer foam of any one of embodiments 40 to 44, wherein the blowing agent consists essentially of Z-1,1,1,4,4,4-hexafluoro-2-butene and methyl formate.

46. The thermoplastic polymer foam of embodiment 40, wherein the blowing agent further comprises HFC-152a.

47. The thermoplastic polymer foam of embodiment 46, wherein the blowing agent comprises about 30% to about 45% by weight Z-1,1,1,4,4,4-hexafluoro-2-butene.

48. The thermoplastic polymer foam of embodiment 46, wherein the blowing agent comprises about 30% to about 40% by weight Z-1,1,1,4,4,4-hexafluoro-2-butene.

49. The thermoplastic polymer foam of any one of embodiments 46 to 48, wherein the blowing agent comprises about 15% to about 35% by weight methyl formate.

50. The thermoplastic polymer foam of any one of embodiments 46 to 48, wherein the blowing agent comprises about 20% to about 35% by weight methyl formate.

51. The thermoplastic polymer foam of any one of embodiments 46 to 50, wherein the blowing agent comprises about 30% to about 45% by weight HFC-152a.

52. The thermoplastic polymer foam of any one of embodiments 46 to 50, wherein the blowing agent comprises about 30% to about 40% by weight HFC-152a.

53. The thermoplastic polymer foam of any one of embodiments 46 to 52, wherein the blowing agent consists essentially of Z-1,1,1,4,4,4-hexafluoro-2-butene, methyl formate, and HFC-152a.

54. The thermoplastic polymer foam of any one of embodiments 40 to 53, wherein the foam has a density of less than about 64 kg/m$^3$, according to ISO method 845-85.

55. The thermoplastic polymer foam of any one of embodiments 40 to 53, wherein the foam has a density of less than about 30 kg/m$^3$, according to ISO method 845-85.

56. The thermoplastic polymer foam of any one of embodiments 40 to 55, wherein the polymer has a melt flow rate of less than about 25 g/10 min.

57. The thermoplastic polymer foam of any one of embodiments 40 to 56, which is a closed cell polymer foam.

58. The thermoplastic polymer foam of any one of embodiments 40 to 57, which is a smooth skin polymer foam.

59. The thermoplastic polymer foam of any one of embodiments 40 to 58, wherein the polymer foam is substantially free of blowholes.

60. The thermoplastic polymer foam of any one of embodiments 40 to 59, wherein the foam comprises at least 70% closed cells.

61. The thermoplastic polymer foam of any one of embodiments 40 to 60, wherein the average cell size of the foam is from about 1 micrometers to about 5,000 micrometers.

62. The thermoplastic polymer foam of any one of embodiments 40 to 60, wherein the average cell size of the foam is from about 10 micrometers to about 5,000 micrometers.

63. The thermoplastic polymer foam of any one of embodiments 40 to 62, wherein the average cell size of the foam is from about 100 micrometers to about 300 micrometers.

64. The thermoplastic polymer foam of any one of embodiments 40 to 63, wherein the foam is a polystyrene foam.

65. The thermoplastic polymer foam of any one of embodiments 40 to 63, wherein the foam is a styrene/acrylonitrile copolymer foam.

66. The thermoplastic polymer foam of any one of embodiments 40 to 65, wherein the foam has a density of about 40 kg/m$^3$ or less.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims. It should be appreciated by those persons having ordinary skill in the art(s) to which the present invention relates that any of the features described herein in respect of any particular aspect and/or embodiment of the present invention can be combined with one or more of any of the other features of any other aspects and/or embodiments of the present invention described herein, with modifications as appropriate to ensure compatibility of the combinations. Such combinations are considered to be part of the present invention contemplated by this disclosure.

What is claimed is:

1. A process for preparing a thermoplastic polymer foam, the process comprising:

(a) providing a foamable composition comprising a thermoplastic polymer and a blowing agent, wherein the blowing agent comprises from about 30% to about 40% by weight Z-1,1,1,4,4,4-hexafluoro-2-butene, 30% to about 40% by weight HFC-152a and from about 15% 20% to about 35% by weight methyl formate; and (b) expanding the foamable composition to produce the thermoplastic polymer foam, wherein the thermoplastic polymer consists of an alkenyl aromatic polymer, wherein the alkenyl aromatic polymer is selected from the group consisting of polystyrene, acrylonitrile-butadiene-styrene copolymer, and styrene-acrylonitrile copolymer, and blends thereof, and wherein solubility of the blowing agent in the alkenyl aromatic polymer is greater than the solubility of a 50/50 wt % mixture of the Z-1,1,1,4,4,4-hexafluoro-2-butene and the HFC-152a in the alkenyl aromatic polymer.

2. The process of claim 1, wherein the solubility of the blowing agent in the alkenyl aromatic polymer is greater than the solubility of the Z-1,1,1,4,4,4-hexafluoro-2-butene, alone, in the alkenyl aromatic polymer.

3. The process of claim 1, wherein the blowing agent consists essentially of the Z-1,1,1,4,4,4-hexafluoro-2-butene, the HFC-152a and the methyl formate.

4. The process of claim 1, wherein the alkenyl aromatic polymer is a polystyrene homopolymer.

5. The process of claim 1, wherein the process is performed at a pressure just before foaming of from about 100 psi to about 5000 psi.

6. The process of claim 1, wherein the process is performed at a pressure just before foaming of from about 750 psi to about 2500 psi.

7. The process of claim 1, further comprising extruding the thermoplastic polymer to form the thermoplastic polymer foam.

8. The process of claim 7, wherein the extruding is performed at a die temperature of from about 100° C. to about 150° C.

9. The process of claim 7, wherein the extruding is performed at a die temperature of from about 120° C. to about 130° C.

10. The process of claim 1, wherein the thermoplastic polymer foam is a closed cell polymer foam.

11. The process of claim 10, wherein the thermoplastic polymer foam comprises at least 70% closed cells.

12. The process of claim 1 wherein the foamable composition further comprises nucleating agent.

13. The process of claim 12, wherein the nucleating agent is selected from the group consisting of talc, graphite, and magnesium silicate.

14. The process of claim 1, wherein the foamable composition further comprises a flame retardant.

15. The process of claim 14, wherein the flame retardant comprises a polymeric flame retardant or a halogenated flame retardant.

16. The process of claim 14, wherein the flame retardant is a brominated styrene-butadiene block copolymer.

17. The process of claim 1, wherein the foamable composition further comprises an Infrared Attenuating Agent.

18. The process of claim 1, wherein the blowing agent is from about 1 part to about 25 parts per hundred parts of the thermoplastic polymer by mass.

19. The process of claim 1, wherein the blowing agent is from about 7 parts to about 18 parts per hundred parts of the thermoplastic polymer by mass.

20. The process of claim 11, wherein the polymer foam having a density of no greater than 40 kg/$m^3$ and the foamable composition having a melt flow rate of less than about 25 g/10 min.

21. A process for preparing a thermoplastic polymer foam, the process comprising:

(a) providing a foamable composition comprising a thermoplastic polymer and a blowing agent, wherein the blowing agent comprises from about 30% to 40% by weight Z-1, 1,1,4,4,4-hexafluoro-2-butene, 30% to 40% by weight HFC-152a and from about 20% to 35% by weight methyl formate, wherein an amount of the blowing agent comprises 1 part to about 25 parts per hundred parts of the thermoplastic polymer by mass, the foamable composition having a melt flow rate of less than about 25 g/10 min; and (b) expanding the foamable composition to produce the thermoplastic polymer foam, wherein the thermoplastic polymer consists of polystyrene, wherein the thermoplastic polymer foam having a density of no greater than 40 kg/$m^3$ and wherein solubility of the blowing agent in the polystyrene is greater than the solubility of a 50/50 wt % mixture of the Z-1,1,1,4,4,4-hexafluoro-2-butene and the HFC-152a in the polystyrene.

* * * * *